Joseph F. Sebald
INVENTOR.

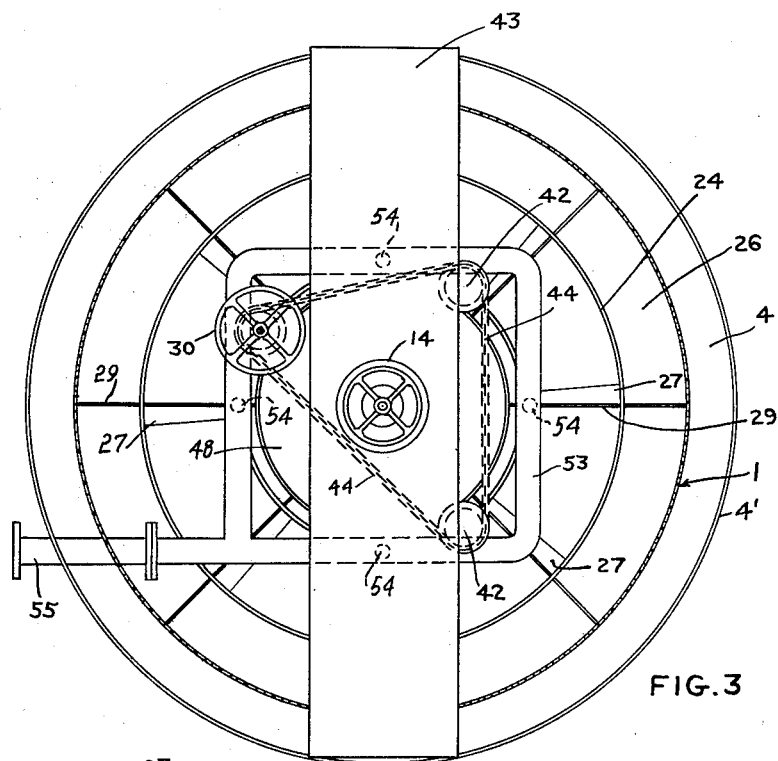
FIG. 3
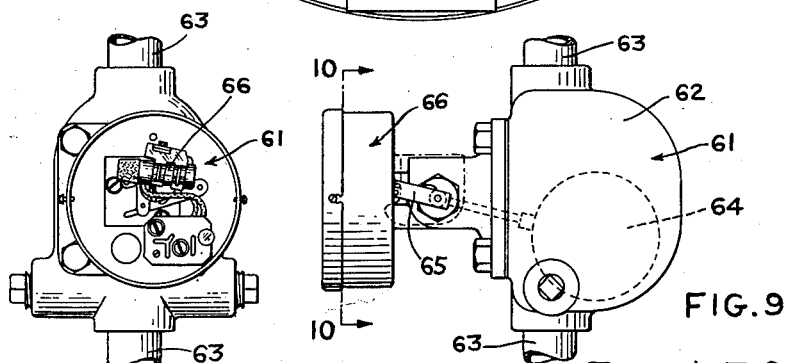
FIG. 10
FIG. 9
Joseph F. Sebald
INVENTOR.

March 28, 1950 J. F. SEBALD 2,502,349
WATER TREATING APPARATUS
Filed May 17, 1946 7 Sheets-Sheet 4

Joseph F. Sebald
INVENTOR.

BY *[signature]*
attorney

Joseph F. Sebald
*INVENTOR.*

Joseph F. Sebald
INVENTOR.

March 28, 1950 J. F. SEBALD 2,502,349
WATER TREATING APPARATUS
Filed May 17, 1946 7 Sheets-Sheet 7
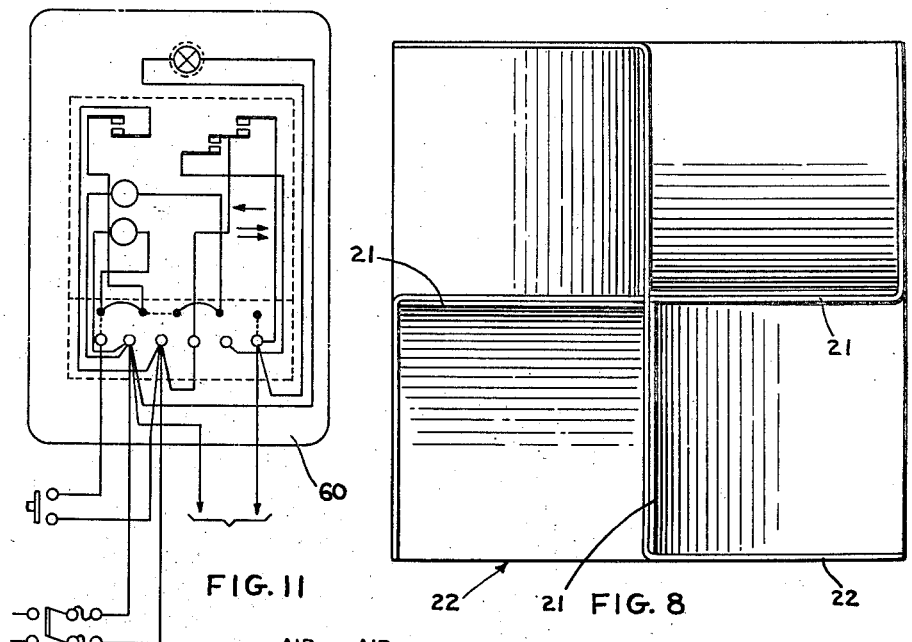
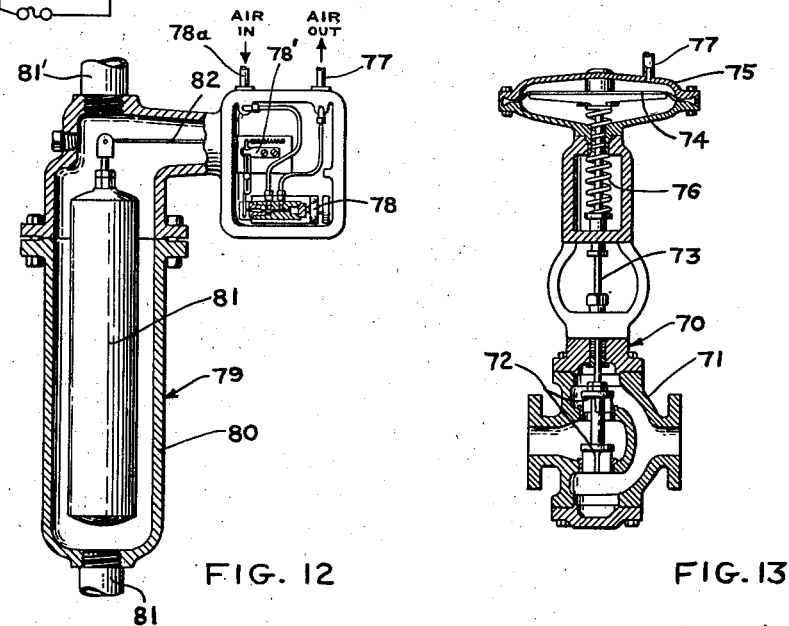
Joseph F. Sebald
INVENTOR.
BY [signature]
attorney Patented Mar. 28, 1950

2,502,349

UNITED STATES PATENT OFFICE 2,502,349

WATER TREATING APPARATUS

Joseph F. Sebald, Bloomfield, N. J., assignor to Worthington Pump and Machinery Corporation, Harrison, N. J., a corporation of Delaware Application May 17, 1946, Serial No. 670,396

29 Claims. (Cl. 210—16)

This invention relates to water treatment or purification, and more particularly to such systems known as cold lime-soda type of treatment.

The present invention relates more specifically to a system and apparatus for treating water by the cold lime-soda method embodying a cold process water softener in which impurities are removed from the water by precipitation induced by chemical action within the softener and with which a recirculating system is employed for recirculating through the softener treated water for the purpose of maintaining substantially constant the quantity water flow through the softener as described in my prior Patent Number 2,365,293, dated December 19, 1944, and it embodies, additionally, the novel features of means for stopping the recirculation of treated water through the softener as the softener approaches full load operation, that is cut off the recirculation of the treated water when the demand for treated water approaches the capacity operation of the apparatus.

Another object of the present invention is to provide means, associated with and embodying the pump used for recirculating treated water, for introducing large quantities of water into the softening or treating chamber during the starting period of the apparatus for the purpose of stirring up all heavily settled sludge in the apparatus, which is necessary to proper operation of the apparatus after it has been shut down over an extended period.

Another object of this invention is to provide means, employing the treated water recirculating pump, which means may when occasion and/or conditions of operation necessitate, pick up a relatively small amount of sludge through the recirculation system of the apparatus for the purpose of speeding up the chemical reaction and precipitation of the foreign matter in the softening apparatus and for a continuous agitation of settled sludge in the apparatus.

A further object of the present invention is the provision of a water softening or treating apparatus which includes a primary recirculation chamber in which recirculation of the water, chemicals, and precipitates is induced by the action of an eductor through which the water to be treated enters the apparatus and also to provide means for adjusting the position of the nozzle of the eductor so that the quantity of recirculation through the primary recirculation chamber may be varied at will.

The present invention also embodies the novel feature of a series of arcuate impingement baffles arranged to produce rotary motion of the liquid below the primary mixing chamber and to provide in effect a second mixing chamber from which the floc mixture passes into and through a suitable annular passage into the floc settling chamber. The annular flow passage is provided with directing vanes to provide rotative floc distribution as the floc mixture flows to the settling chamber. The invention embodies the further novel feature of adjustment of these flow direction vanes to provide or permit variation of the floc concentration in the primary and secondary mixing spaces.

In some instances, depending upon the nature of the water being treated it has been found desirable to feed some form of phosphate into the apparatus to change the soluble calcium carbonate hardness remaining in the treated water after the lime-soda treatment to precipitate of calcium phosphate which is removed from the water by filtration. In other instances, it is desirable to feed other treating chemicals into the water after the lime-soda treatment such as sulphuric acid to regulate or control the hydrogen ion concentration of the treated water, and an object of the present invention is to provide means for introducing such chemicals into the water after the lime-soda treatment and to control the quantity of such chemicals in direct proportion to the quantity flow of raw water, to be treated, into the apparatus.

Also in some instances it is desirable to introduce a coagulant such as, alum, ferric-sulphate or the like into the apparatus, adding such coagulant directly in the mixing chamber of the apparatus, so as to increase the rate of flocculation and size of floc particle, and a further object of the invention is to control the flow of such coagulant to the apparatus in direct proportion to the quantity of raw water entering the apparatus.

With these and other objects in view, as may appear from the accompanying specification, the invention consists of various features of construction and combination of parts, which will be first described in connection with the accompanying drawings, showing a water treating system and apparatus of a preferred form embodying the invention, and the features forming the invention will be specifically pointed out in the claims.

In the drawings:

Figure 3 is a top plan of the water treating apparatus.

Figure 8 is a plan view of the stationary flow directing vanes employed in the water treating apparatus and taken approximately on the lines 8—8 of Figure 2.

Figure 9 is a detail elevation of a float operated switch employed for controlling operation of the recirculating pump.

Figure 10 is a detail view of the switch shown in Figure 9 and taken on the line 10—10 of Figure 9.

Figure 11 is a diagrammatic view of a magnetic starter employed in the system.

Figure 12 is a detail section of a liquid level float actuated control employed in the system.

Figure 13 is a section through a pressure operated valve mechanism employed in the system.

Figure 1:
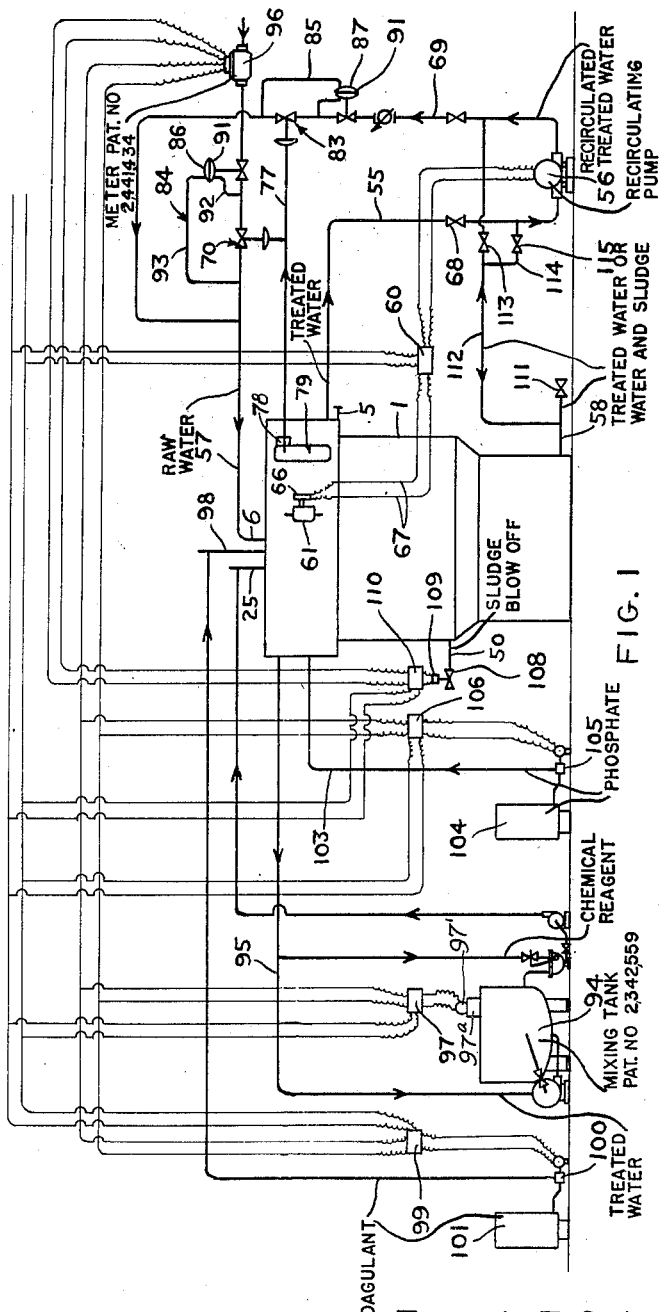
Figure 1 is a diagrammatic view of the water treating apparatus and system.

In describing the invention specifically with reference to the drawings, the water softener will be first described and subsequently its use and association with other elements in the system as shown in Figure 1 of the drawings will be taken up.

The water treating or softening apparatus includes a substantially cylindrical receptacle 1 which opens at its top through a weir 2 formed by a series of annularly spaced notches 3 into the treated water storage space 4 from which the water after treatment is drawn off for use through the outlet 5.

Figure 6:
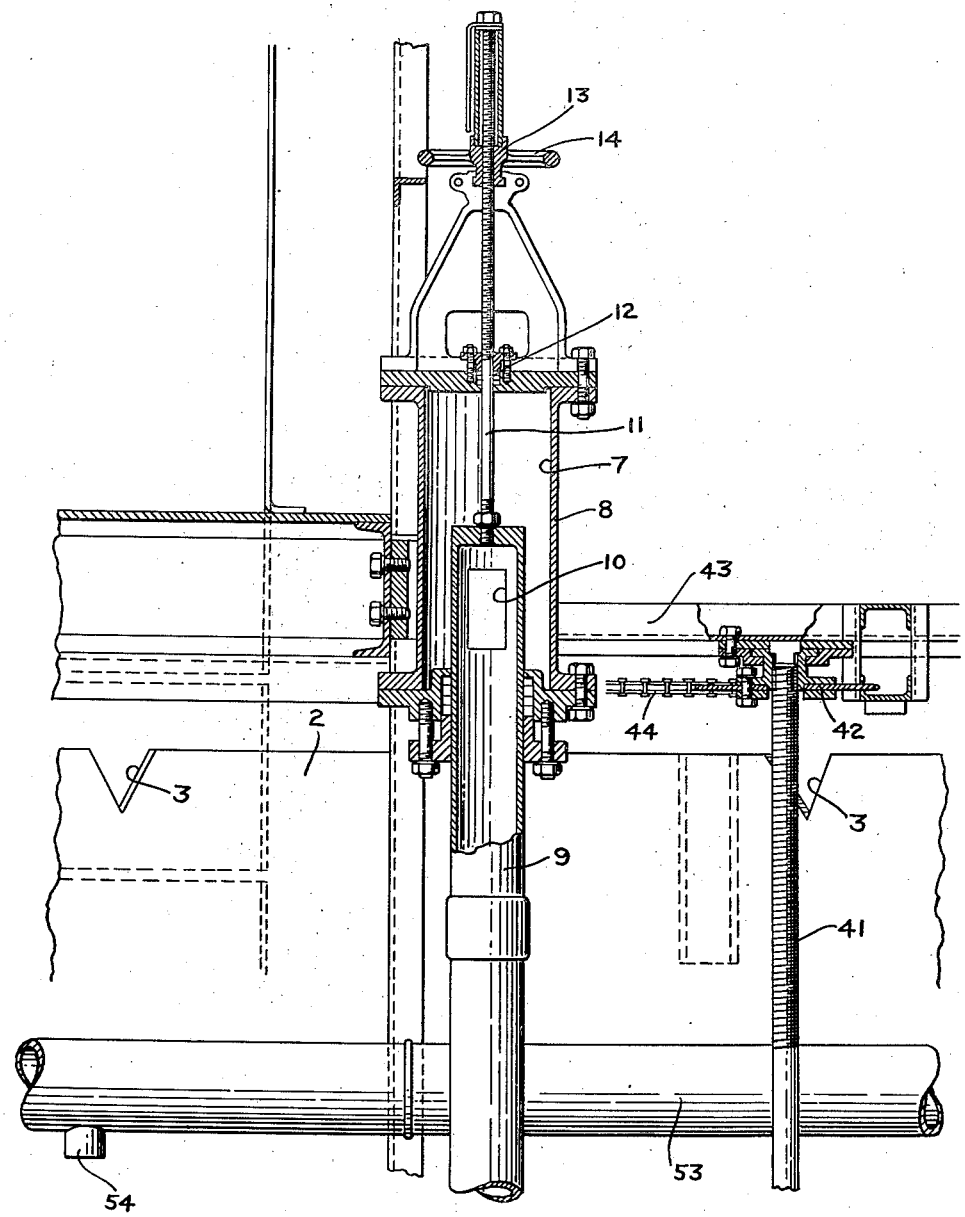
Figure 6 is a detail vertical section taken on the line 6—6 of Figure 2.
Figure 7:
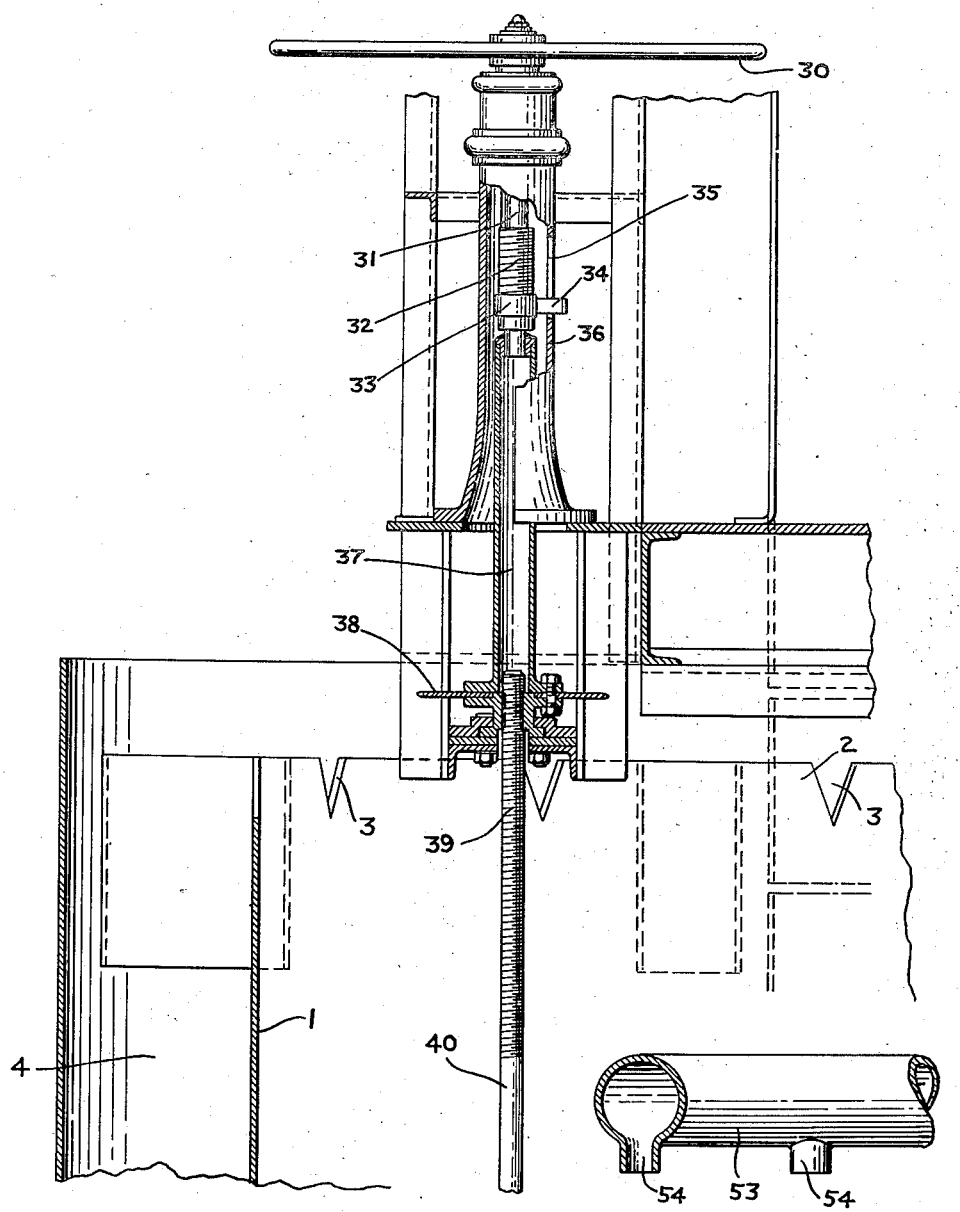
Figure 7 is a detail vertical section taken on line 7—7 of Figure 2.

Raw water to be treated enters the apparatus through the raw water inlet 6 from the main or raw water supply pipe 57 into the chamber or space 7. The chamber or space 7 is confined within a cylindrical housing 8 into which the water inlet nozzle 9 extends, as clearly shown in Figure 6 of the drawings. The water inlet nozzle 9 has its upper end closed and is provided with inlet openings 10 through which the raw water flows from the chamber or space 7, into the nozzle 9.

The nozzle 9 has a rod 11 connected to its upper end whch is extended through a suitable stuffing box 12 and through the nut 13 carried by a hand wheel 14 so that by rotation of the hand wheel 14 the nozzle 9 may be raised or lowered for the purpose hereinafter more specifically described. The lower end of the nozzle 9 has a discharge tip 15 thereon which discharges into the upper flared end 16 of an eductor 17. The upper flared end 16 of the eductor 17 has its outlet opening into the straight connecting portion 18 which in turn discharges into the small inlet end of the downwardly and outwardly flaring outlet 19 of the eductor 17.

The eductor 17 discharges the raw water into the primary mixing space 20 located centrally within the receptacle 1 at the bottom of the receptacle and against a plurality of arcuate impingement baffles 21 arranged so as to impart rotational flow to the liquid discharged from the eductor. The baffles 21 are arranged and connected to form the impingement baffle structure or unit 22.

Figure 5:
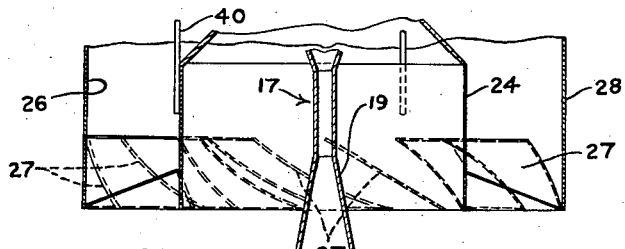
Figure 5 is a detail vertical section through the water treating apparatus showing the adjustable flow guiding vanes.

The nozzle 15 discharging into the flaring upper end 16 of the eductor 17 will provide an eduction action causing a circulation of water and precipitated floc in the circulation chamber or space 23. The space 23 is formed by the annular partition 24, which is located axially within the receptacle 1 directly above the mixing chamber 20. Suitable braces 24' and 24a are provided for supporting the annular partition 24 in place. A chemical reagent is fed into the circulating chamber 23 through the inlet nozzle structure 25 so that the circulating action of the water induced by the eductor 17 will cause a thorough mixing and circulation of the water and the lime-soda to cause precipitation of the foreign material into what is commonly known as floc. The circulation of the floc and some of the water through the eductor, mixing chamber 20 and circulation chamber 23 will facilitate a precipitation of the foreign material in the mixture, increase the size of the floc particles and facilitate the purification of the water. The mixture of floc and water flows outwardly from the impingement baffle structure 22 into the primary recirculation and secondary mixing space 26 which is an annular space below and outwardly of the annular partition 24. The mixture flows upwardly through this primary recirculation and secondary mixing space 26 where it is engaged by the flow directing vanes 27. The raw water ejected by the nozzle 15 into the flaring end of the eductor 17 causes an intake or inflow of mixed water, chemical, and such floc as has been precipitated into the eductor 17. This mixture picked up from the circulating chamber or space 23 is discharged by the eductor into the mixing space 20 wherein further mixing agitated action is set up by the baffles 21 of the impingement baffle structure 22. The agitated action set up by the structure 22 continues as the mixture of chemicals, water and floc passes into the primary recirculation and secondary mixing space 26 causing a continuation of the mixing action of the chemical, water and floc in this space 26. From the space 26 the mixture passes in gradually decreasing rotary movement upwardly into and through the precipitation space 26' wherein the foreign matter, contained in the water, which has not previously been precipitated, precipitates out of the water and forms a floc bed or blanket of precipitated floc (not shown). The floc bed or blanket of precipitated floc forms a filter through which the treated water flows on its way to the storage chamber 4. The flow directing vanes 27 are stationarily carried by a vertically adjustable annular shell 28 and they are curved as shown in Figure 5 of the drawings to impart rotary movement to the mixture of water and floc as it passes upwardly through the space 26. The rotative motion of the floc and water mixture reduces as the mixture passes upwardly and is finally stilled by a series of annularly spaced settling baffles 29 which extend to the top, or approximately to the top of the floc bed which forms at the top of the precipitation space 26' in the receptacle 1. As the upward rotary movement of the floc and water mixture reduces, the floc will congregate in a filtering floc bed through which the water filters into the top of the receptacle 1 for flow therefrom into the treated water compartment 4.

The treated water compartment may be an annular compartment formed about the upper end of the receptacle 1 by the annular wall 4' which is connected to the receptacle 1 by the bottom 4a.

The flow directing vanes 27 which provide the rotative floc distribution may be raised and lowered to admit variation of the floc concentration in the primary and secondary mixing chambers 23, and 26 respectively.

The vertical adjustment of the vanes 27 is provided by means of manual operation of the hand wheel 30. The hand wheel 30 is connected to a stub shaft 31 having a threaded portion 32 thereon. A nut 33 is mounted on the threaded portion 32 and has a finger 34 thereon. The finger 34 engages in a slot 35 formed in the housing 36. The stub shaft 31 is connected by a hollow connecting shaft 37 to a sprocket wheel 38 which has its hub internally screw threaded to receive the upper threaded end 39 of the adjusting rod 40. The lower end of the adjusting rod 40 is connected in any suitable manner to the annular sheet 28 so that when the hand wheel 30 is rotated the rod 40 will be moved upwardly or downwardly for adjusting the shell 28 and baffles 27 vertically. The nut 33 travels vertically on the threaded portion 32 of the shaft 31 and the finger 34 engaging the ends of the slot 35 forms a stop for limiting the vertical adjustment of the shell 28 and baffles 27. Owing to the fact that most water treating apparatus of the type of the present invention is relatively large it is necessary to provide more than one point of adjustable connection with the annular shell 28 and therefore a plurality of adjusting rods 41 which are similar to the rod 40 have their lower ends connected to the shell 28 at annularly spaced points. Sprockets 42 are rotatably carried by the stationary superstructure 43 supported at the top of the tank and they have screw threads on their hub portions the same as the sprocket 38 which engage the upper threaded ends of the rods 41. The sprockets 42 are connected to the sprocket 38 by a sprocket chain 44 so that all of the sprockets 38, and 42 will be rotated synchronously to provide uniform adjustment of all parts of the annular shell 28.

The vertical adjustment of the inlet nozzle 9 for the raw water regulates the quantity of recirculation of the water floc and chemical mixture through the primary mixing chamber 23 since the pressure and velocity of the incoming raw water provides the motive force for inducing such recirculation, thus the quantity recirculation may be varied at will by adjustment of the nozzle 9.

A sludge settling compartment 48 is provided by means of the annular partition 48' preferably centrally within the receptacle 1 directly above the primary circulation chamber 23 and the conical top 49 of the primary circulation chamber 23 forms the bottom of the sludge settling compartment 48. The top of the sludge compartment 48 is open and is spaced a short distance above the top of the settling baffles 29 so that as the thickness of the floc bed tends to increase it will flow over into the sludge settling compartment 48 from which it is withdrawn in a highly concentrated state through the sludge blow off pipe 50. The sludge blow off pipe 50 has a plurality of downwardly opening inlets 51 therein, which open downwardly into the lower portions of the sludge settling compartment 48 so that when the sludge blow off pipe is open the sludge will pass outwardly from the sludge settling compartment.

Figure 2:
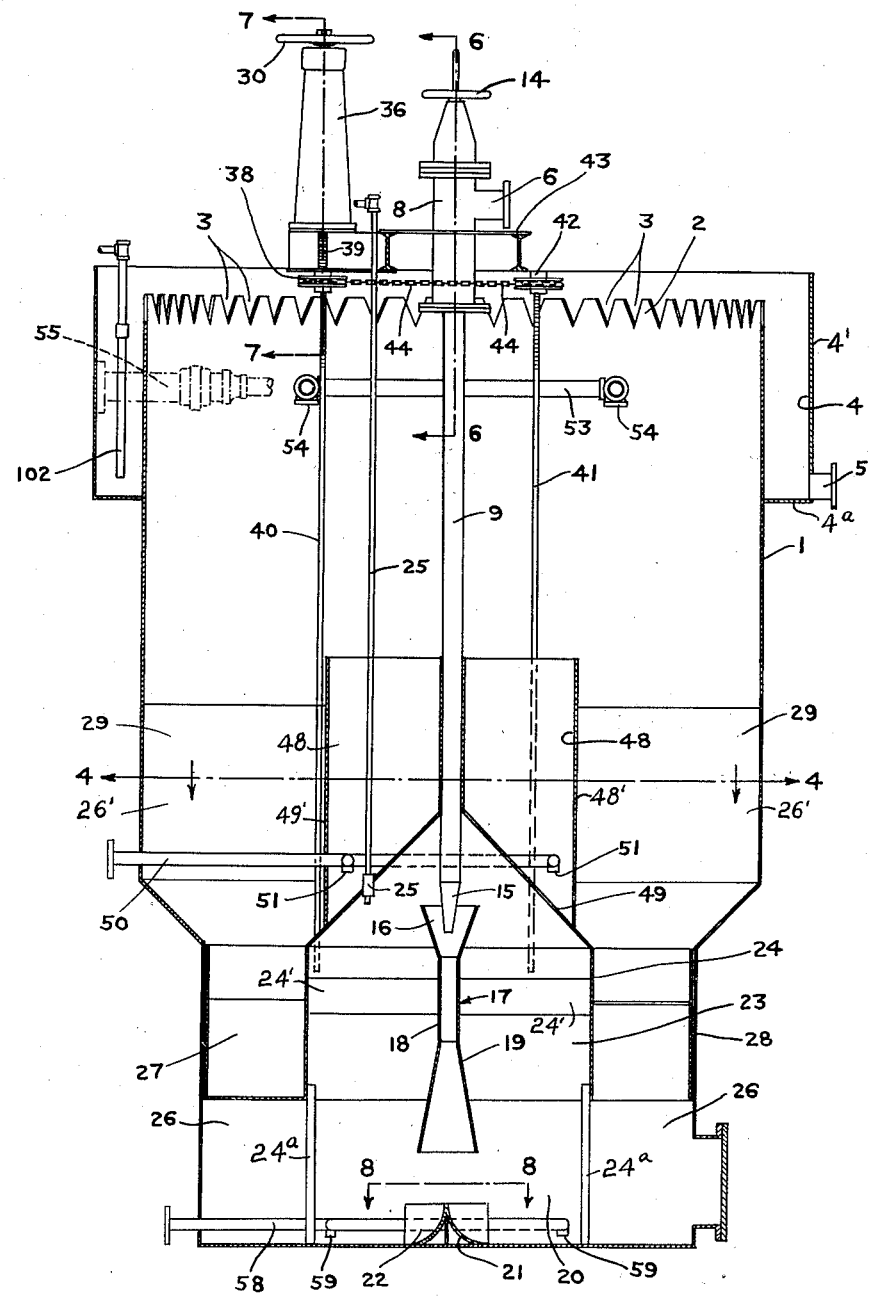
Figure 2 is a vertical section through the water treating apparatus.
Figure 4:
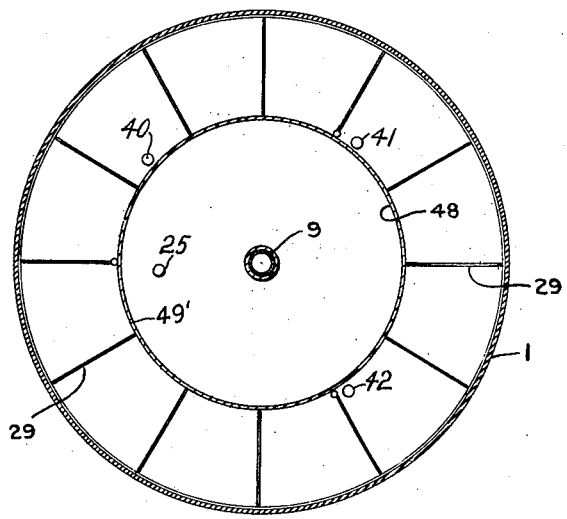
Figure 4 is a horizontal section taken on the line 4—4 of Figure 2.

Just below the surface of the water at the top of the tank is a pipe arrangement 53 (see Figures 2 and 3) which has a plurality of inlets 54. The pipe arrangement 53 has connection through pipe 55 with the suction of the recirculating pump 56 for withdrawing treated water from the top of the water treating apparatus, and returning it to the water treating apparatus through the main or raw water supplying pipe 57 in the manner and under the control as will be described in connection with the description of the system as shown in the drawings.

This recirculation of treated water maintains a substantially uniform flow of water through the water treating apparatus irrespective of the load demand for treated water.

An auxiliary sludge blow off pipe 58 is mounted in the bottom of the receptacle 1 and it has a plurality of inlet connections indicated at 59 opening downwardly for removing concentrated sludge from the bottom of the receptacle 1.

Referring particularly to the flow diagram for a water softener method or system, as per the present invention, and as it is shown in Figure 1 of the drawings, the recirculating pump 56 is shown as an electric motor driven centrifugal pump of any approved construction. The operation of the pump is controlled through a magnetic starter 60 of any approved type which can be purchased upon the open market and it is shown in diagram in Figure 11 of the drawings. Since starters of this type are well known and as its construction forms no part of the present invention it will not be specifically described here. The automatic control of the operation of the recirculation pump 56 through the magnetic starter is provided by a float switch structure 61 which like the magnetic starter may be purchased upon the open market. The float switch structure 61 is illustrated in Figures 9 and 10 of the drawings and comprises a float chamber 62 for connection between suitable pipes 63 with the interior of the receptacle 1 so that the same water level will be maintained in the receptacle 1 and in the float chamber 62. The float 64 which is positioned in the float chamber 62 is connected by suitable linkage indicated at 65 with a tumble switch 66 which is in turn connected by suitable electric wires indicated at 67 with the magnetic starter 60 so that the operation of the electric motor (not shown) of the centrifugal pump 56 will be controlled by the water level in the receptacle 1 through the provision of the float 64 and tumble switch 66. A hand operated valve 68 is interposed in the pipe 55 to the suction of the pump 56. The discharge pipe 69 from the recirculating pump 56 is connected to the main raw water supply pipe 57 so that the recirculated treated water will mix with the incoming raw water and be discharged into the apparatus through the water inlet nozzle 9.

Figure 14:
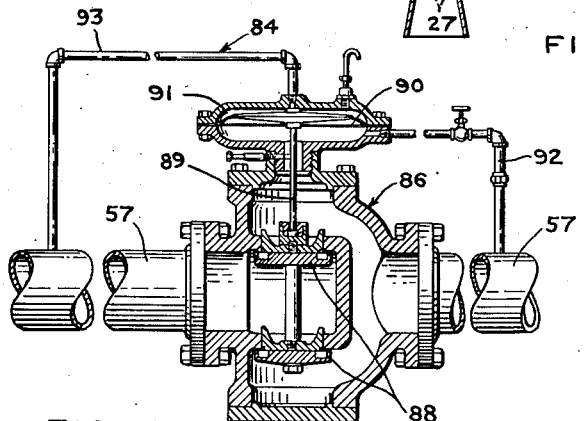
Figure 14 is a detail section through a pressure actuated valve structure employed in the system for controlling the pressure differential across the pressure actuated valves shown in Figure 13.

The quantity of raw water delivered to the receptacle 1 is controlled by the level of water in the receptacle through the medium of a pressure actuated valve structure 70 positioned in the raw water supply line 57. The pressure actuated valve structure 70 is shown in section in Figure 13 of the drawings and it comprises the valve housing 71 having the valves 72 positioned therein which control the flow of water through the valve housing and consequently through the line or pipe 57. The valve stem 73 which is connected to the valve 72 is connected to a diaphragm 74 located within a sealed housing 75, The diaphragm 74 is urged into valve opening position by a spring 76 and into valve closing position by the pressure of air which enters the housing 75 through a pipe connection 77. The flow of air through the pipe 77 is controlled by a float actuated pilot valve 78. The float actuated air pilot valve 78 forms a part of liquid level control device 79 which is shown in section in Figure 12 of the drawings. The float level control device 79 includes a housing 80 which has connection through a suitable pipe 81' with the interior of the receptacle 1 so that water may flow from the receptacle 1 into the housing 80 and actuate the float therein. The float 81 is connected by a suitable lever 82 to the pilot valve actuating device 78' so that the pilot valve 78 will be actuated by variances in the water level in the receptacle 1 to control the pressure of air delivered to the valves 70 and 83, and these valves will be operated in accordance with variation in the water level in the receptacle 1. By particularly referring to Figure 1 of the drawings it will be noted that the valve 70 is located outwardly of the connection between the discharge line 69 of the recirculating pump 56 with the water supply pipe 57, so that the discharge supply of recirculated water is not under control of the valve 70. However a second pressure actuated valve structure 83 which is similar to the pressure actuated valve 70, but reverse acting and which will be under control of the water level in the receptacle 1 through the medium of the level control float structure 79 is placed in the discharge line 69 to control the flow of recirculated treated water into the receptacle 1. Pilot lines 84 and 85 are provided which pass around the valves 70 and 83 respectively. These pilot lines 84 and 85 are for control of pressure actuated valve structures 86 and 87 respectively, which are provided for the purpose of maintaining a predetermined and constant pressure differential across the pressure actuated valves 70 and 83 for the purpose of regulating or standardizing the quantity of fluid flowing through the pressure actuated valves 70 and 83 irrespective of the quantity or pressure of fluid in advance of, or at the inlet sides of the air inlet actuated valves 70 or 83. The pressure actuated valve structures 86 and 87 are identical in construction and a section through one of them is shown in Figure 14 of the drawings.

The pressure actuated valve structures 86 and 87 each comprise a valve housing connected respectively in the lines 57 and 69 to control the flow of the water through these lines or pipes. Since both of these valve structures 86 and 87 are identical only the valve structure 86 will be specifically described. The valves 88 of the valve structure 86 which controls the flow of liquid through the pipe 57 are connected to each other and have a stem 89 connected thereto which is in turn connected to a diaphragm 90. The diaphragm 90 is positioned in a sealed housing 91. The inlet of the housing on one side of the diaphragm 90 is connected by a pipe 92 to the pipe 57 in advance of the pressure actuated valve structure 70, while the interior of the housing 91 upon the opposite sides of the diaphragm 90 is connected by a pipe 93 with the pipe 57 at the discharge or outlet side of the pressure actuated valve structure 70 so that the diaphragm 90 will be subjected to the pressure of the liquid at the inlet and outlet sides of the valve structure 70 and thus when the pressure on the discharge side of pressure actuated valve 70 is greater than the pressure on the inlet side of the valve, the diaphragm 90 will be depressed, opening the valves 88, whereas the reverse is true when pressure on the inlet of the valve 70 is greater than the pressure on the outlet side.

The lime-soda supply to the water treating apparatus is supplied from a mixing tank 94 which is fully described and disclosed in my prior Patent Number 2,342,559, issued February 22, 1944. This mixing tank structure receives its water for mixing with the chemical from the treated water chamber 4' through suitable pipe 95 and the quantity of the softening chemicals delivered to the receptacle 1 through the inlet 25 is controlled by the quantity of raw water flowing through the receptacle 1 through the medium of a water meter 96 which in turn controls the decanting of the softening chemical from the tank 94, all as disclosed in my prior patent above mentioned. The meter 96 may be any approved structure which includes a meter actuated switch for opening and closing electrical circuits in a multi-circuit system at predetermined time intervals for controlling auxiliary devices in accordance with the rate of flow of liquid through the meter. One such meter is shown in Patent 2,441,434, May 11, 1948, which shows the control of a mixing tank of the same construction as mixing tank 94.

A coagulant such as alum, ferric sulphate or similar coaguating compound is added directly to the mixing chamber of the apparatus 1 through a suitable pipe or nozzle 98 which is identical to nozzle 25, in order to eliminate the possibility of scaling the softening chemical pipes. The flow of the coagulant into the receptacle 1 is controlled in direct proportion to the quantity of raw water entering the softener through the medium of a magnetic starter 99 which is controlled by the meter 96. The magnetic starter 99 is any approved well known type which may be purchased on the open market and is similar to the magnetic starters 60, and 97 and it controls operation of the electric motor operated pump 100 which delivers the coagulant from the supply tank 101 to the nozzle 98. The magnetic starter 97 controls operation of the motor 97' of the decanting mechanism 97a of the mixing tank 94. The construction, manner of installation and manner of operation of magnetic starters of this type are well known to those skilled in the present art and their specific detail of construction and manner of operation will not be described herein.

In some instances, depending upon the nature of the water being treated it has been found desirable to feed some form of phosphate into the apparatus to change the soluble calcium carbonate hardness remaining in the treated water after the lime-soda or softening treatment to a precipitate of calcium phosphate which is removed from the water by filtration and for the purpose of supplying such phosphate to the apparatus, an inlet nozzle pipe 102 extends into the treated water compartment 4'. The nozzle 102 receives the phosphate through a pipe 103 from a supply tank 104. The phosphate is pumped from the tank 104 by an electric motor operated pump 105. The pump 105 is under control of the meter 96 through a magnetic starter 106 so that the amount of phosphate delivered to the treated water compartment 4 will be in direct proportion to the quantity of raw water entering the apparatus. The magnetic starter 106 is the same as the magnetic starters 60, 97, and 99. The sludge blow off pipe 50 has a control valve 108 therein which is opened to permit the removal of sludge from the settling chamber 48. The valve 108 is operated by a solenoid actuated valve structure 109 of any approved construction which may be purchased upon the open market. The solenoid actuated structure 109 includes a time delay relay 110 of any approved construction, the electrical energizing of which is controlled by the meter 96 so that the sludge will be drawn or blow off from the settling chamber 48 at predetermined interval under control of the quantity of raw water fed to the receptacle 1.

The auxiliary sludge blow off 58 has a manually operated valve 111 connected thereto by means of which the removal of sludge from the bottom of the receptacle 1 is controlled.

A by-pass pipe 112 is connected to the sludge blow off pipe 58 and to the discharge line 69 of the recirculating pump 56. This by-pass line 112 provides means for introducing relatively large quantities of water to the primary mixing space 26 during the starting up period of the apparatus, in that water discharged by the pump 56 will be by-passed through the by-pass 112 directly into the secondary mixing chamber. The flow of water through the by-pass 112 is controlled by a hand valve 113. With the reduced friction head on the pump 56 the by-pass of the water through the by-pass 112 permits substantially a one hundred percent increase in flow of water from the secondary mixing chamber 26 upward through the receptacle 1 which will stir up all heavily settled sludge, facilitating the efficient operation of the apparatus after an extended shut down.

The by-pass 112 has a second by-pass pipe 114 connected thereto which is in turn connected to the suction of the pump 56. A manually operated valve 115 controls the flow of liquid through the by-pass 114. When the valve 115 is opened the valve 113 is of course closed. By opening the valve 115 a small amount of concentrated sludge will be drawn from the bottom of the receptacle 1, mixed with treated water entering the suction of the pump 56 and discharged into the receptacle 1 through the inlet nozzle 15 for the purpose of speeding up the chemical reaction in the primary mixing chamber 20.

The magnetic starters 60, 97 and 99, and 106, are all conventional magnetic starters which are manufactured by companies and are standard well known apparatus, and since their structure forms no part of the present invention it will not be specifically described herein. Their construction, operation and manner of installation are familiar not only to those skilled in the art to which this invention relates, but to those skilled in any other art so that it is relatively common knowledge as to how they are connected and inserted in the control circuit of an apparatus wherein they are always connected in an electric circuit to control the energizing and de-energizing of motors and various kinds of electrically operated devices. Their manners of connection in the circuit of the apparatus depend entirely upon the various conditions of use and operation of the apparatus.

In the present instance, the magnetic starters are connected in the electrical circuits of the operating motors of the recirculating pump 56, motor of the mixing tank 94, the coagulant pump 100, and the phosphate pump 105, respectively.

The flow of electrical current through the respective magnetic starters is in turn controlled by the meter 96. As previously stated, this meter 96 may be of the type of meter such as that shown in Patent #2,441,434, May 11, 1948; of the type shown in Patent #2,355,561, August 18, 1944, or one of the many other well known types of flow meters embodying a meter actuated switch for opening and closing individual electrical circuits in a multi-circuit system at predetermined intervals for controlling auxiliary devices in accordance with the rate of flow of liquid through the meter. Such meters are well known and have been used in the water treating industry for many years.

The operation of the water treating system and apparatus is generically as follows: Raw water to be treated passes from any suitable source of supply (not shown) through the meter 96 where its quantity is measured and the flow of the water through the meter 96 operates the meter mechanism which in turn operates the selective electrical switch of the meter structure for controlling the operation of the various auxiliary devices, as hereinafter referred to.

The raw water is discharged by the nozzle 9 into the eductor 17 and from thence into the primary mixing space 20 where it is mixed with the chemical reagent. The chemical reagent is delivered to the primary mixing space 20 through the inlet nozzle 25 from the mixing tank structure 94. The amount of chemical reagent delivered to the primary mixing space 20 is proportioned to the quantity of raw water delivered to the primary mixing space, by the meter 96 which through its electrical switch (not shown) controls operation of the magnetic starter 97. The magnetic starter 106 controls operation of the mixing tank structure 94.

The mixing of the water and the chemical reagent in the primary mixing space 20 results in precipitation of some of the foreign matter or hardness producing substance in the water, in the form of floc. Part of the mixture of water, reagent and floc rises into the circulating space 23 where part of it is picked up by the eductor 17 and recirculated through the primary mixing space 20. The part of the mixture of water, reagent and floc, which does not pass through the circulating space 23 flows in a whirling rotary bath (induced by the impingement baffle structure 22) into the secondary mixing space 26 and passes upwardly through this space 26. During the upward flow of the mixture through the space 26 it is engaged by the flow directing vanes 27 which impart a slight rotary movement to the flowing mixture. The mixture passes into the settling or precipitation space 26' having its rotary motion ironed out by the baffles 29. In the settling or precipitation space 26' the precipitated floc settles or separates out of the mixture, forming the usual floc bed which acts as a filter for successively treated water. The filter treated water passes on upwardly through the receptacle 1 and flows into the storage space or compartment 4 for treated water from whence it is drawn off for use.

As the floc bed thickens, it, floating at the top of the mixture, will gradually run or spill over the top of the annular partition 48' into the sludge settling compartment 48 from where it is drawn off through the sludge blow off 50. Operation of the valve 108 controlling the blow off of sludge is controlled by the meter 96 through its switch mechanism and the solenoid actuated valve structure 109 and time delay relay 110, so that sludge will be automatically drawn off at times after a predetermined quantity of raw water has been delivered to the primary mixing space 20.

In treatment of some waters it may be desirable or necessary to add a coagulant and/or phosphate to the mixture, as herein above referred to, and therefore a coagulant delivering pump 100 and a phosphate delivering pump 105 are provided for delivering these chemicals into the receptacle at the proper points. The pumps 100 and 105 are of any approved electric motor operated types and their operation is controlled by the meter 96 through its electric switch structure and the magnetic starters 99 and 106, respectively, to control the delivery of these chemicals to the mixture in accordance with predetermined quantity flow of raw water through the meter 96. As is well known, meters of the type herein employed and embodying the meter actuated switches as above referred to may be set to operate the switches to operate the various devices controlled thereby at any desired predetermined intervals, or upon flow of any predetermined quantity of water through the meter. Thus, by setting of the meter parts the quantities of chemicals delivered to the mixture may be regulated to meet the requirements of the particular water being treated.

The best results and highest efficiency of the apparatus are obtained when the apparatus is operating at full capacity, but at times during its operation the demand for treated water is below the capacity of the apparatus, and at such times the quantity of treated water in the storage space or compartment 4 builds up. When the quantity of treated water in the storage space reaches a predetermined level, it will through the flow operated mechanism 79 cause operation of the valve 70 reducing the quantity of raw water delivered to the primary mixing space 20. At approximately the same time that the quantity of raw water flowing to the primary mixing space 20 is reduced, the recirculating pump 56 will be started through the medium of the float structure 61 and the magnetic starter 60 and will draw treated water from the receptacle 1 and deliver it into the pipe 57 between the valve 70 and the inlet nozzle 9, thus making up in quantity the amount of water flowing through the apparatus to compensate for the reduced quantity of raw water being delivered to the apparatus. A pressure actuated valve structure 91 is interposed between the valve 70 and the meter 96 and its diaphragm 80 is under action of the pressures in the pipe or line 57 on opposite sides of the valve 70 so that if the flow or recirculated treated water is such as to cause a building up of pressure in raw water outwardly of the valve 70, the valve 91 will be operated to further reduce the quantity of raw water delivered to the apparatus. However, in the event the pressure on the opposite side of the valve 70 changes so that the pressure of the recirculated water and raw water inwardly of the valve 70 is lower than the pressure of the raw water outwardly of the valve 70, then the valve 92 will operate to supply more raw water to the apparatus, thus providing a proper quantity of flow of water through the apparatus at all conditions of raw or raw and recirculated water flow.

A valve 83 is located in the pipe 69 which delivers the recirculated water to the apparatus, and this valve like the valve 70 is operated by and under control of the float mechanism 79. A pressure actuated valve structure 87 is connected in the line or pipe 69 and its diaphragm 90 is under action of pressure from the line 69 on opposite sides of the valve 83, so that it operates in exactly the same manner as the pressure actuated valve structure 86 to control and regulate the flow of recirculated water.

Upon starting up the apparatus after it has been shut down for a period of time it is desirable to stir up the floc or sludge which may have settled in the bottom of the apparatus, and to provide for this the discharge line or pipe 69 of the recirculating pump 56 is connected by a conduit or pipe 112 with the sludge blow off pipe 58 so that treated water may be pumped in a reverse direction through this blow off pipe 58 into the receptacle.

At times it may be desirable to add some of the mixture of water, reagent and floc to the ingoing raw water to facilitate precipitation in the apparatus and to permit this a by-pass conduit 114 is connected to the conduit or pipe 112 and to the suction of the pump 56 so that the pump will draw a mixture of water reagent and floc from the bottom of the receptacle 1 and deliver it to the nozzle 9. Suitable valves 68, 114, and 115 are provided in the various conduits leading to the pump 56 to permit this operation.

It will be understood that the invention is not to be limited to the specific construction or arrangement of parts shown, but that they may be widely modified within the invention defined by the claims.

What is claimed is:

1. In a water treating apparatus, a receptacle containing a mixing space, a precipitation space, a settling chamber and a storage chamber for treated water, means for delivering raw water to be treated to said mixing space, said storage chamber having an outlet for treated water, means for recirculating treated water through said spaces comprising a pump having its suction opening into the receptacle at a point where treated water will enter the pump, a conduit connecting the discharge of said pump to the means for delivering raw water to the mixing space, a valve in said conduit, a by-pass line connected to the discharge of said pump and opening into said mixing space for pumping treated water into the mixing space, and a valve for controlling flow of liquid through said by-pass line.

2. In a water treating apparatus, a receptacle containing a mixing space, a precipitation space, a settling chamber and a storage chamber for treated water, means for delivering raw water to be treated to said mixing space, said storage chamber having an outlet for treated water, means for recirculating treated water through said spaces comprising a pump having its suction opening into the receptacle at a point where treated water will enter the pump, a conduit connecting the discharge of said pump to the means for delivering raw water to the mixing space, a valve in said conduit, and a conduit connected to the suction of said pump and to said mixing space for withdrawing mixed water and floc from the mixing space and discharging it into the stream of raw water flowing to the receptacle, and a valve in said last named conduit for controlling flow of mixed water and floc therethrough.

3. In a water treating apparatus, a receptacle containing a mixing space, a precipitation space, a settling chamber and a storage chamber for treated water, means for delivering raw water to be treated to said mixing space, said storage chamber having an outlet for treated water, means for recirculating treated water through said spaces comprising a pump having its suction opening into the receptacle at a point where treated water will enter the pump, a conduit connecting the discharge of said pump to the means for delivering raw water to the mixing space, a valve in said conduit, a conduit connected to the suction of said pump and to said mixing space for withdrawing mixed water and floc from the mixing space and discharging it into the stream of raw water flowing to the mixing space, and a by-pass line connected to the discharge of said pump and opening into said mixing space for pumping treated water into the mixing space, and valves controlling flow of fluid through said conduit and said by-pass line.

4. In a water treating apparatus, a receptacle containing a mixing space, a precipitation space, a settling chamber, and a storage chamber for treated water, means for delivering raw water to be treated to said mixing space, said storage chamber having an outlet for treated water, means for recirculating treated water through said spaces comprising a pump having its suction opening into the receptacle at a point beyond the furthermost point of floc and water separation whereby treated water will enter the pump, a conduit connecting the pump discharge to the means for delivering raw water to the receptacle, and means actuated by variances in the level of water in the storage chamber for independently regulating the quantities of raw water and recirculated water delivered to the receptacle.

5. In a water treating apparatus, a receptacle containing a mixing space, a precipitation space, a settling chamber, and a storage chamber for treated water, means for delivering raw water to be treated to said mixing space, said storage chamber having an outlet for treated water, means for recirculating treated water through said spaces comprising a pump having its suction opening into the receptacle at a point beyond the furthermost point of floc and water separation whereby treated water will enter the pump, a conduit connecting the pump discharge to the means for delivering raw water to the mixing space, means actuated by variances in the level of water in the storage chamber for independently regulating the quantities of raw water and recirculated water delivered to the mixing space, a conduit connected to the discharge of said pump and opening into said mixing space for pumping treated water from the settling chamber into the mixing space, and a valve in said conduit.

6. In a water treating apparatus, a receptacle containing a mixing space, a precipitation space, a settling chamber, and a storage chamber for treated water, means for delivering raw water to be treated to said mixing space, said storage chamber having an outlet for treated water, means for recirculating treated water through said receptacle comprising a pump having its suction opening into the receptacle at a point beyond the furthermost point of floc and water separation whereby treated water will enter the pump from the storage chamber, a conduit connecting the pump discharge to the means for delivering raw water to the mixing space, means actuated by variances in the level of water in the storage chamber for independently regulating the quantities of raw water and recirculated water delivered to the mixing space, a conduit connected to the suction of said pump and to the mixing space for withdrawing mixed water and floc from the mixing space and discharging it into the stream of raw water flowing to the receptacle, and a valve in said conduit.

7. In a water treating apparatus, a receptacle containing a mixing space, a precipitation space, a settling chamber, and a storage chamber for treated water, means for delivering raw water to be treated to said mixing space, said storage chamber having an outlet for treated water, means for delivering a chemical into water in said treated water storage chamber, and means controlled by the quantity of raw water delivered to said receptacle for controlling the delivery of chemical into said storage chamber.

8. In a water treating apparatus, a receptacle containing a mixing space, a precipitation space, a settling chamber and a storage chamber for treated water, means for delivering raw water to be treated to said mixing space, said storage chamber having an outlet for treated water, means for recirculating treated water through said receptacle comprising a pump having its suction opening into the receptacle at a point where treated water will enter the pump, a conduit connecting the pump discharge to the means for delivering raw water to the mixing space, a conduit connected to the suction of said pump and to said mixing space for withdrawing mixed water and floc from the mixing space and discharging it into the stream of raw water flowing to the receptacle, a valve in said conduit, a by-pass line connected to the discharge of said pump and opening into said mixing space for pumping treated water into the mixing space, a valve in said by-pass, means for delivering a chemical into water in said treated water storage chamber, and means controlled by the quantity of raw water delivered to said mixing space for controlling the delivery of chemical into said storage chamber.

9. In a water treating apparatus, a receptacle containing a mixing space, a precipitation space, a settling chamber, and a storage chamber for treated water, means for delivering raw water to be treated to said mixing space, said storage chamber having an outlet for treated water, means for delivering a chemical into water in said treated water storage chamber, means controlled by the quantity of raw water delivered to said receptacle for controlling the delivery of chemical into said storage chamber, means for delivering a water softening chemical mixture to said mixing space, means for delivering a coagulant to said mixing space, and means actuated by the flow of raw water to the mixing space for controlling the quantity of coagulant delivered to the mixing space in direct proportion to the quantity of raw water delivered to the mixing space.

10. In a water treating apparatus, a receptacle containing a mixing space, a precipitation space, a settling chamber, and a storage chamber for treated water, means for delivering raw water to be treated to said mixing space, said storage chamber having an outlet for treated water, means for recirculating treated water through said mixing space comprising a pump having its suction opening into the receptacle at a point where water separated from the floc will enter the pump; said pump having its discharge connected to the means for delivering raw water to the mixing space, a valve in the discharge line of said pump, a valve in the raw water supply line, and means actuated by variances in the water level in said storage space for controlling operation of said valves.

11. In a water treating apparatus, a receptacle containing a mixing space, a precipitating space, a settling chamber, and a storage chamber for treated water, means for delivering raw water to be treated to said mixing space, said storage chamber having an outlet for treated water, said raw water delivering means including a nozzle, an eductor in said mixing space into which said nozzle discharges, means for delivering a chemical into the mixing space whereby the velocity of water discharged into said eductor by said nozzle will induce a recirculation of mixed water, chemical and floc through said mixing space, and means for adjusting the position of said nozzle relative to said eductor to regulate the quantity of mixed water chemicals and floc recirculated through said mixing space.

12. In a water treating apparatus, a receptacle containing a mixing space, a precipitation space, a settling chamber, and a storage chamber for treated water, means for delivering raw water to be treated to said mixing space, said storage chamber having an outlet for treated water, said raw water delivering means including a nozzle, an eductor in said mixing space into which said nozzle discharges, means for delivering a chemical into the mixing space whereby the velocity of water discharged into said eductor by said nozzle will induce a recirculation of mixed water, chemical and floc through said mixing space, a plurality of stationary curved vanes spaced outwardly of the outlet of said eductor to impart a lateral and upward rotating movement to the mixture leaving the mixing space, and means for adjusting the position of said nozzle relative to said eductor to regulate the quantity of mixture of water, chemicals and floc recirculated through said mixing space.

13. In a water treating apparatus, a receptacle containing a mixing space, a precipitating space, a settling chamber, and a storage chamber for treated water, means for delivering raw water to be treated to said mixing space, said storage chamber having an outlet for treated water, said raw water delivering means including a nozzle, an eductor in said mixing space into which said nozzle discharges, means for delivering a chemical into the mixing space whereby the velocity of water discharged into said eductor by said nozzle will induce a recirculation of mixed water, chemical and floc through said mixing space, a plurality of stationary curved vanes spaced outwardly of the outlet of said eductor to impart a lateral and upward rotating movement to the mixture leaving the mixing space, and a plurality of angular flow directing vanes in the path of the mixture flowing from the curved vanes to the precipitating space.

14. In a water treating apparatus, a receptacle containing a mixing space, a precipitating space, a settling chamber, and a storage chamber for treated water, means for delivering raw water to be treated to said mixing space, said storage chamber having an outlet for treated water, said raw water delivering means including a nozzle, an eductor in said mixing space into which said nozzle discharges, means for delivering a chemical into the mixing space whereby the velocity of water discharged into said eductor by said nozzle will induce a recirculation of mixed water, chemical and floc through said mixing space, a plurality of stationary curved vanes spaced outwardly of the outlet of said eductor to impart a lateral and upward rotating movement to the mixture leaving the mixing space, a partition within said precipitating space and forming a floc settling chamber, and a plurality of angular flow directing vanes in the path of the mixture flowing from said curved vanes to the precipitating space to provide rotary distribution of the floc mixture into the lower portion of the floc settling chamber.

15. In a water treating apparatus, a receptacle containing a mixing space, a precipitating space, a settling chamber, and a storage chamber for treated water, means for delivering raw water to be treated to said mixing space, said storage chamber having an outlet for treated water, said raw water delivering means including a nozzle, an eductor in said mixing space into which said nozzle discharges, means for delivering a chemical into the mixing space, whereby the velocity of water discharged into said eductor by said nozzle will induce a recirculation of mixed water, chemical and floc through said mixing space, a plurality of stationary curved vanes spaced outwardly of the outlet of said eductor to impart a lateral and upward rotating movement to the mixture leaving the mixing space, a partition within said precipitating space and forming a floc settling chamber, a plurality of angular flow directing vanes in the path of the mixture flowing from said curved vanes to the precipitating space to provide rotary distribution of the floc mixture into the lower portion of the floc settling chamber, and means for adjusting the position of said flow directing vanes to provide variation of the floc concentration in the mixing space.

16. In a water treating apparatus, a receptacle containing a mixing space, a precipitating space, a settling chamber, and a storage chamber for treated water, means for delivering raw water to be treated to said mixing space, said storage chamber having an outlet for treated water, said raw water delivering means including a nozzle, an eductor in said mixing space into which said nozzle discharges, means for delivering a chemical into the mixing space whereby the velocity of water discharged into said eductor by said nozzle will induce a recirculation of mixed water, chemical and floc through said mixing space, a plurality of stationary curved vanes spaced outwardly of the outlet of said eductor to impart a lateral and upward rotating movement to the mixture leaving the mixing space, a partition within said precipitating space and forming a floc settling chamber, a plurality of angular flow directing vanes in the path of the mixture flowing from said curved vanes to the precipitating space to provide rotary distribution of the floc mixture into the lower portion of the floc settling chamber, and a floc blow-off connection communicating with the lower portion of said floc settling chamber.

17. In a water treating apparatus, a receptacle containing a mixing space, a precipitating space, a settling chamber, and a storage chamber for treated water, means for delivering raw water to be treated to said mixing space, said storage chamber having an outlet for treated water, said raw water delivering means including a nozzle, an eductor in said mixing space into which said nozzle discharges, means for delivering a chemical into the mixing space whereby the velocity of water discharged into said eductor by said nozzle will induce a recirculation of mixed water, chemical and floc through said mixing space, a plurality of stationary curved vanes spaced outwardly of the outlet of said eductor to impart a lateral and upward rotating movement to the mixture leaving the mixing space, a partition within said precipitating space and forming a floc settling chamber, a plurality of angular flow directing vanes in the path of the mixture flowing from said curved vanes to the precipitating space, means for adjusting the position of said flow directing vanes to provide variation of the floc concentration in the mixing space, and a floc blow-off connection communicating with the lower portion of said floc settling chamber.

18. In a water treating apparatus, a receptacle containing a mixing space, a precipitating space, a settling chamber, and a storage chamber for treated water, means for delivering raw water to be treated to said mixing space, said storage chamber having an outlet for treated water, said raw water delivering means including a nozzle, an eductor in said mixing space into which said nozzle discharges, means for delivering a chemical into the mixing space whereby the velocity of water discharged into said eductor by said nozzle will induce a recirculation of mixed water, chemical and floc through said mixing space, a plurality of stationary curved vanes spaced outwardly of the outlet of said eductor to impart a lateral and upward rotating movement to the mixture leaving the mixing space, a partition within said precipitating space and forming a floc settling chamber, a plurality of angular flow directing vanes in the path of the mixture flowing from said curved vanes to the precipitating space to provide rotary distribution of the floc mixture into the lower portion of the floc settling chamber, means for adjusting the position of said flow directing vanes to provide variation of the floc concentration in the mixing space, a floc blow-off connection communicating with the lower portion of said floc settling chamber, and a second floc flow-off connection opening into said receptacle at the lowermost portion thereof below said mixing space.

19. In a water treating apparatus, a receptacle containing a mixing space, a precipitating space, a settling chamber, and a storage chamber for treated water, means for delivering raw water to be treated to said mixing space, said storage chamber having an outlet for treated water, means for delivering a treating chemical into said mixing space, means in said mixing space for inducing a recirculation of a mixture of treating chemical, water and precipitated floc through the mixing space, a plurality of angular flow-directing vanes in the path of the mixture of chemicals, water and floc from the mixing space to the precipitating space, and means for adjusting the position of said flow-directing vanes to provide variation of the floc concentration in the mixing space.

20. In a water treating apparatus, a receptacle containing a mixing space, a precipitating space, a settling chamber, and a storage chamber for treated water, means for delivering raw water to be treated to said mixing space, said storage chamber having an outlet for treated water, means for delivering a treating chemical into said mixing space, means in said mixing space for inducing a recirculation of a mixture of treating chemical, water and precipitated floc through the mixing space, a plurality of angular flow-directing vanes in the path of the mixture of chemicals, water and floc from the mixing space to the precipitating space, means for adjusting the position of said flow-directing vanes to provide variation of the floc concentration in the mixing space, and radially extending flow stilling baffles in said precipitating space.

21. In a water treating appaartus, a receptacle containing a mixing space, a precipitating space, a settling chamber, and a storage chamber for treated water, means for delivering raw water to be treated to said mixing space, said storage chamber having an outlet for treated water, means for delivering a treating chemical into said mixing space, means in said mixing space for inducing a recirculation of a mixture of treating chemical, water and precipitated floc through the mixing space, a partition within said precipitating space forming a floc settling chamber, a plurality of angular flow-directing vanes in the path of the mixture flowing from said mixing space to the precipitating space to provide rotary distribution of the floc mixture into the lower portion of the floc settling chamber, and means for adjusting the position of said flow-directing vanes to provide variation of the floc concentration in the mixing space.

22. In a water treating apparatus, a receptacle containing a mixing space, a precipitating space, a settling chamber, and a storage chamber for treated water, means for delivering raw water to be treated to said mixing space, said storage chamber having an outlet for treated water, means for delivering a treating chemical into said mixing space, means in said mixing space for inducing a recirculation of a mixture of treating chemical, water and precipitated floc through the mixing space, a partition within said precipitating space forming a floc settling chamber, a plurality of angular flow-directing vanes in the path of the mixture flowing from said mixing space to the precipitating space, means for adjusting the position of said flow-directing vanes to provide variation of the floc concentration in the mixing space, and a floc blow-off connection communicating with the lower portion of said floc settling chamber.

23. In a water treating apparatus, a receptacle containing a mixing space, a precipitating space, a settling chamber, and a storage chamber for treated water, means for delivering raw water to be treated to said mixing space, said storage chamber having an outlet for treated water, means for delivering a treating chemical into said mixing space, means in said mixing space for inducing a recirculation of a mixture of treating chemical, water and precipitated floc through the mixing space, a partition within said precipitating space forming a floc settling chamber, a plurality of angular flow-directing vanes in the path of the mixture flowing from said mixing space to the precipitating space to provide rotary distribution of the floc mixture into the lower portion of the floc settling chamber, means for delivering chemical into water in the treated water storage chamber, and means controlled by the quantity of raw water delivered to said mixing space for controlling the delivery of chemical into the storage chamber.

24. In a water treating apparatus, a receptacle containing a mixing space, a precipitating space, a settling chamber, and a storage chamber for treated water, means for delivering raw water to be treated to said mixing space, said storage chamber having an outlet for treated water, means for delivering a treating chemical into said mixing space, means in said mixing space for inducing a recirculation of a mixture of treating chemical, water and precipitated floc through the mixing space, a partition within said precipitating space forming a floc settling chamber, a plurality of angular flow-directing vanes in the path of the mixture flowing from said mixing space to the precipitating space to impart rotary distribution of the floc mixture into the lower portion of the floc settling chamber, means for adjusting the position of said flow-directing vanes to provide variation of the floc concentration in the mixing space, means for delivering a coagulant to said mixing space, and means actuated by the flow of raw water to the mixing space for controlling the quantity of coagulant delivered to the mixing space in direct proportion to the quantity of raw water delivered to the mixing space.

25. In a water treating apparatus, a receptacle containing a mixing space, a precipitating space, a settling chamber, and a storage chamber for treated water, means for delivering raw water to be treated to said mixing space, said storage chamber having an outlet for treated water, means for delivering a treating chemical into said mixing space, means in said mixing space for inducing a recirculation of a mixture of treating chemical, water and precipitated floc through the mixing space, a partition within said precipitating space forming a floc settling chamber, a plurality of angular flow-directing vanes in the path of the mixture flowing from said mixing space to the precipitating space to provide rotary distribution of the floc mixture into the lower portion of the floc settling chamber, means for adjusting the position of said flow-directing vanes to provide variation of the floc concentration in the mixing space, and means for recirculating treated water through the receptacle including a pump having its suction connected to a source of treated water in the receptacle and its discharge connected to the means for delivering raw water to the mixing space.

26. In a water treating apparatus, a receptacle containing a mixing space, a precipitating space, a settling chamber, and a storage chamber for treated water, means for delivering raw water to be treated to said mixing space, said storage chamber having an outlet for treated water, means for delivering a treating chemical into said mixing space, means in said mixing space for inducing a recirculation of a mixture of treating chemical, water and precipitated floc through the mixing space, a partition within said precipitating space forming a floc settling chamber, a plurality of angular flow-directing vanes in the path of the mixture flowing from said mixing space to the precipitating space to provide rotary distribution of the floc mixture into the lower portion of the floc settling chamber, means for adjusting the position of said flow-directing vanes to provide variation of the floc concentration in the mixing space, means for recirculating treated water through the receptacle including a pump having its suction connected to a source of treated water in the receptacle and its discharge connected to the means for delivering raw water to the mixing space, and means operated by variances in the level of water in the storage chamber for shutting off said pump when the apparatus approaches full capacity operation.

27. In a water treating apparatus, a receptacle containing a mixing space, a precipitating space, a settling chamber, and a storage chamber for treated water, means for delivering raw water to be treated to said mixing space, said storage chamber having an outlet for treated water, means for delivering a treating chemical into said mixing space, means in said mixing space for inducing a recirculation of a mixture of treating chemical, water and precipitated floc through the mixing space, a partition within said precipitating space forming a floc settling chamber, a plurality of angular flow-directing vanes in the path of the mixture flowing from said mixing space to the precipitating space to provide rotary distribution of the floc mixture into the lower portion of the floc settling chamber, means for adjusting the position of said flow-directing vanes to provide variation of the floc concentration in the mixing space, a conduit having its inlet opening into the receptacle at a point for receiving treated water into the conduit, a recirculating pump, the outlet of said conduit connected to the suction of said pump, a conduit connected to the discharge of said pump and to said raw water delivering means whereby treated water may be recirculated through the receptacle, a pressure-actuated valve in the conduit connected to the discharge of said pump, a pressure actuated valve in the raw water supply means, and means actuated by variances in the water level in said storage space for controlling operation of said pressure actuated valves.

28. In a water treating apparatus, a receptacle containing a mixing space, a precipitating space, a settling chamber, and a storage chamber for treated water, means for delivering raw water to be treated to said mixing space, said storage chamber having an outlet for treated water, means for delivering a treating chemical into said mixing space, means in said mixing space for inducing a recirculation of a mixture of treating chemical, water and precipitated floc through the mixing space, a partition within said precipitating space forming a floc settling chamber, a plurality of angular flow-directing vanes in the path of the mixture flowing from said mixing space to the precipitating space to provide rotary distribution of the floc mixture into the lower portion of the floc settling chamber, means for adjusting the position of said flow-directing vanes to provide variation of the floc concentration in the mixing space, a conduit having its inlet opening into the receptacle at a point for receiving treated water into the conduit, a recirculating pump, the outlet of said conduit connected to the suction of said pump, a conduit connected to the discharge of said pump and to said raw water delivering means whereby treated water may be recirculated through the receptacle, a pressure-actuated valve in the conduit connected to the discharge of said pump, a pressure-actuated valve in the raw water supply means, means actuated by variances in the water level in said storage space for controlling operation of said pressure actuated valves, and means for maintaining a predetermined and constant pressure differential across said pressure-actuated valves for standardizing the quantity of water flowing through the pressure-actuated valves irrespective of the quantity or pressure of the liquids in the lines in advance of the valves.

29. In a water treating apparatus, a receptacle containing a mixing space, a precipitating space, a settling chamber, and a storage chamber for treated water, means for delivering raw water to be treated to said mixing space, said storage chamber having an outlet for treated water, means for delivering a treating chemical into said mixing space, means in said mixing space for inducing a recirculation of a mixture of treating chemical, water and precipitated floc through the mixing space, a partition within said precipitating space forming a floc settling chamber, a plurality of angular flow-directing vanes in the path of the mixture flowing from said mixing space to the precipitating space to provide rotary distribution of the floc mixture into the lower portion of the floc settling chamber, means for adjusting the position of said flow-directing vanes to provide variation of the floc concentration in the mixing space, a conduit having its inlet opening into the receptacle at a point for receiving treated water into the conduit, a recirculating pump, the outlet of said conduit connected to the suction of said pump, a conduit connected to the discharge of said pump and to said raw water delivering means whereby treated water may be recirculated through the receptacle, a pressure-actuated valve in the conduit connected to the discharge of said pump, a pressure-actuated valve in the raw water supply means, means actuated by variances in the water level in said storage space for controlling operation of said pressure-actuated valves, means for maintaining a predetermined and constant pressure differential across said pressure-actuated valves for standardizing the quantity of water flowing through the pressure-actuated valves irrespective of the quantity or pressure of the liquid in the lines in advance of the valves, and adjustable means for regulating the quantity of the mixture of the water, chemicals and precipitate recirculated through said mixing space.

JOSEPH F. SEBALD.

REFERENCES CITED

The following references are of record in the file of this patent:

UNITED STATES PATENTS

| Number | Name | Date |
| --- | --- | --- |
| 838,535 | Greer | Dec. 18, 1906 |
| 1,608,661 | Nordell | Nov. 30, 1926 |
| 2,021,248 | Waugh | Nov. 19, 1935 |
| 2,240,164 | Pick | Apr. 29, 1941 |
| 2,353,358 | Prager | July 11, 1944 |
| 2,355,069 | Green | Aug. 8, 1944 |
| 2,355,561 | Robinson | Aug. 8, 1944 |
| 2,355,564 | Sebald | Aug. 8, 1944 |
| 2,365,293 | Robinson | Dec. 19, 1944 |
| 2,378,799 | Sebald | June 19, 1945 |
| 2,383,086 | Sebald | Aug. 21, 1945 |